US011121360B2

(12) United States Patent
Zhamu et al.

(10) Patent No.: US 11,121,360 B2
(45) Date of Patent: Sep. 14, 2021

(54) SUPERCRITICAL FLUID PRODUCTION OF GRAPHENE-BASED SUPERCAPACITOR ELECTRODE FROM COKE OR COAL

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments Group, LLC, Dayton, OH (US)

( * ) Notice: Subject to any disclaimer, the term of this patent is extended or adjusted under 35 U.S.C. 154(b) by 422 days.

(21) Appl. No.: 15/211,522

(22) Filed: Jul. 15, 2016

(65) Prior Publication Data
US 2018/0019071 A1    Jan. 18, 2018

(51) Int. Cl.
*H01M 4/1393*    (2010.01)
*H01G 11/42*    (2013.01)
(Continued)

(52) U.S. Cl.
CPC .......... *H01M 4/1393* (2013.01); *C01B 32/19* (2017.08); *C04B 35/524* (2013.01);
(Continued)

(58) Field of Classification Search
CPC ........ C04B 32/19; H01G 11/32; H01G 11/42; H01G 11/44; H01G 11/84; H01G 11/86;
(Continued)

(56) References Cited

U.S. PATENT DOCUMENTS

| 4,931,213 A | 6/1990 | Cass |
| 5,753,388 A | 5/1998 | Koksbang et al. |

(Continued)

FOREIGN PATENT DOCUMENTS

| EP | 2975001 A1 | 1/2016 |
| EP | 2975001 | 12/2016 |

(Continued)

OTHER PUBLICATIONS

Magasinski et al., Graphitization, intercalation, and exfoliation of cokes and anthracites; A comparative study, Fuel Processing Technology 79, (2002) pp. 259-264. (Year: 2002).*

(Continued)

*Primary Examiner* — Atul P. Khare

(57) ABSTRACT

Provided is a process for producing a graphene-based supercapacitor electrode from a supply of coke or coal powder, comprising: (a) exposing this powder to a supercritical fluid for a period of time in a pressure vessel to enable penetration of the supercritical fluid into internal structure of the coke or coal; wherein the powder is selected from petroleum coke, coal-derived coke, meso-phase coke, synthetic coke, leonardite, anthracite, lignite coal, bituminous coal, or natural coal mineral powder, or a combination thereof; (b) rapidly depressurizing the supercritical fluid at a fluid release rate sufficient for effecting exfoliation and separation of the coke or coal powder to produce isolated graphene sheets, which are dispersed in a liquid medium to produce a graphene suspension; and (c) shaping and drying the graphene suspension to form the supercapacitor electrode having a specific surface area greater than 200 m$^2$/g.

29 Claims, 4 Drawing Sheets

(51) Int. Cl.

| | | |
|---|---|---|
| *C01B 32/19* | (2017.01) | |
| *H01G 11/44* | (2013.01) | |
| *H01G 11/26* | (2013.01) | |
| *C04B 35/528* | (2006.01) | |
| *H01G 11/36* | (2013.01) | |
| *H01M 4/62* | (2006.01) | |
| *H01M 4/133* | (2010.01) | |
| *C04B 35/524* | (2006.01) | |
| *H01G 11/24* | (2013.01) | |
| *H01G 11/32* | (2013.01) | |
| *H01G 11/86* | (2013.01) | |

(52) U.S. Cl.
CPC ........... *C04B 35/528* (2013.01); *H01G 11/24* (2013.01); *H01G 11/26* (2013.01); *H01G 11/32* (2013.01); *H01G 11/36* (2013.01); *H01G 11/42* (2013.01); *H01G 11/44* (2013.01); *H01G 11/86* (2013.01); *H01M 4/133* (2013.01); *H01M 4/625* (2013.01); *C04B 2235/425* (2013.01); *C04B 2235/5292* (2013.01); *H01M 2220/20* (2013.01); *Y02E 60/13* (2013.01); *Y02P 20/54* (2015.11)

(58) Field of Classification Search
CPC .... H01M 4/133; H01M 4/1393; H01M 4/625; C01B 32/19
See application file for complete search history.

(56) References Cited

U.S. PATENT DOCUMENTS

| | | | |
|---|---|---|---|
| 6,872,330 B2 | 3/2005 | Mack | |
| 7,071,258 B1 | 7/2006 | Jang | |
| 7,327,000 B2 | 2/2008 | DeHeer | |
| 7,623,340 B1 | 11/2009 | Song | |
| 7,790,285 B2 | 9/2010 | Zhamu et al. | |
| 7,824,651 B2 | 11/2010 | Zhamu et al. | |
| 7,875,219 B2 * | 1/2011 | Zhamu | H01G 9/058 264/109 |
| 7,948,739 B2 | 5/2011 | Zhamu | |
| 8,202,669 B2 * | 6/2012 | Jang | H01M 4/8663 429/405 |
| 8,216,541 B2 * | 7/2012 | Jang | B82Y 30/00 252/500 |
| 8,227,685 B2 | 7/2012 | Choi | |
| 8,318,385 B2 | 11/2012 | Jang et al. | |
| 8,361,430 B2 | 1/2013 | Beall | |
| 8,497,225 B2 * | 7/2013 | Zhamu | H01G 11/34 361/321.4 |
| 8,652,687 B2 * | 2/2014 | Zhamu | H01G 11/38 361/502 |
| 8,696,938 B2 | 4/2014 | Zhamu et al. | |
| 8,753,539 B2 | 6/2014 | Zhamu et al. | |
| 8,947,854 B2 | 2/2015 | Zhamu et al. | |
| 9,190,696 B2 | 11/2015 | He et al. | |
| 9,203,084 B2 * | 12/2015 | Wang | H01M 4/366 |
| 9,360,905 B2 * | 6/2016 | Zhamu | H01L 23/373 |
| 9,363,932 B2 * | 6/2016 | Wang | H05K 7/20963 |
| 9,368,831 B2 | 6/2016 | He et al. | |
| 9,533,889 B2 * | 1/2017 | Zhamu | C30B 5/00 |
| 9,558,860 B2 * | 1/2017 | Zhamu | B82Y 30/00 |
| 9,561,955 B2 * | 2/2017 | Zhamu | B82Y 30/00 |
| 9,812,736 B2 | 11/2017 | He et al. | |
| 9,890,469 B2 * | 2/2018 | Zhamu | C30B 5/00 |
| 9,899,120 B2 * | 2/2018 | Zhamu | H01B 1/04 |
| 10,081,550 B2 | 9/2018 | Zhamu et al. | |
| 10,081,551 B2 | 9/2018 | Zhamu et al. | |
| 10,427,941 B2 | 10/2019 | Zhamu et al. | |
| 10,435,797 B2 | 10/2019 | Zhamu et al. | |
| 2005/0271574 A1 | 12/2005 | Jang | |
| 2008/0048152 A1 | 2/2008 | Jang | |
| 2008/0070777 A1 | 3/2008 | Jang et al. | |
| 2008/0206124 A1 | 8/2008 | Jang et al. | |
| 2008/0268318 A1 | 10/2008 | Jang et al. | |
| 2008/0279756 A1 | 11/2008 | Zhamu et al. | |
| 2009/0028778 A1 | 1/2009 | Zhamu et al. | |
| 2009/0061312 A1 | 3/2009 | Zhamu | |
| 2009/0092747 A1 | 4/2009 | Zhamu et al. | |
| 2009/0155578 A1 | 6/2009 | Zhamu et al. | |
| 2009/0169467 A1 | 7/2009 | Zhamu et al. | |
| 2010/0021819 A1 | 1/2010 | Zhamu | |
| 2010/0044646 A1 | 2/2010 | Zhamu et al. | |
| 2010/0206363 A1 | 8/2010 | Choi | |
| 2010/0272628 A1 | 10/2010 | Kim et al. | |
| 2011/0017585 A1 | 1/2011 | Zhamu et al. | |
| 2011/0046027 A1 | 2/2011 | Zhamu et al. | |
| 2011/0159372 A1 | 6/2011 | Zhamu et al. | |
| 2011/0165321 A1 | 7/2011 | Zhamu et al. | |
| 2011/0281154 A1 | 11/2011 | Vissers et al. | |
| 2011/0287304 A1 | 11/2011 | Zinck et al. | |
| 2012/0077080 A1 | 3/2012 | Liu et al. | |
| 2012/0113565 A1 | 5/2012 | Kim et al. | |
| 2012/0153772 A1 | 6/2012 | Landa et al. | |
| 2012/0154983 A1 | 6/2012 | Zhang et al. | |
| 2012/0237435 A1 | 9/2012 | Petrik | |
| 2012/0328929 A1 | 12/2012 | Matsumoto et al. | |
| 2013/0001089 A1 | 1/2013 | Li et al. | |
| 2013/0052538 A1 | 2/2013 | Pasta et al. | |
| 2013/0140495 A1 | 6/2013 | Beall | |
| 2013/0161199 A1 | 6/2013 | Li et al. | |
| 2013/0171502 A1 | 7/2013 | Chen et al. | |
| 2013/0236715 A1 | 9/2013 | Zhamu et al. | |
| 2013/0319870 A1 | 12/2013 | Chen et al. | |
| 2013/0327648 A1 | 12/2013 | Grant et al. | |
| 2013/0329366 A1 | 12/2013 | Wang et al. | |
| 2013/0330611 A1 * | 12/2013 | Chen | B82Y 30/00 429/211 |
| 2014/0027299 A1 | 1/2014 | Loh et al. | |
| 2014/0072871 A1 | 3/2014 | Chen et al. | |
| 2014/0107326 A1 | 4/2014 | Swager et al. | |
| 2014/0124176 A1 * | 5/2014 | Zhamu | H01L 23/373 165/133 |
| 2014/0134092 A1 | 5/2014 | Shankman | |
| 2014/0174513 A1 | 6/2014 | Russo et al. | |
| 2014/0242275 A1 | 8/2014 | Zhamu et al. | |
| 2014/0248214 A1 | 9/2014 | Hersam et al. | |
| 2015/0027900 A1 | 1/2015 | Dryfe et al. | |
| 2015/0064574 A1 | 3/2015 | He et al. | |
| 2015/0232340 A1 | 8/2015 | Bao et al. | |
| 2015/0239741 A1 | 8/2015 | Burton et al. | |
| 2016/0019995 A1 | 1/2016 | Zhamu et al. | |
| 2016/0043384 A1 | 2/2016 | Zhamu et al. | |
| 2016/0060122 A1 | 3/2016 | Tour et al. | |
| 2016/0079001 A1 | 3/2016 | Lin et al. | |
| 2016/0284481 A1 | 9/2016 | Duan et al. | |
| 2016/0347617 A1 | 12/2016 | Zhang et al. | |
| 2017/0370009 A1 | 12/2017 | Zhamu et al. | |
| 2018/0019069 A1 | 1/2018 | Zhamu et al. | |
| 2018/0019071 A1 | 1/2018 | Zhamu et al. | |
| 2018/0019072 A1 | 1/2018 | Zhamu et al. | |
| 2018/0370803 A1 | 12/2018 | Zhamu et al. | |

FOREIGN PATENT DOCUMENTS

| | | | |
|---|---|---|---|
| ES | 2529189 A1 | 2/2015 | |
| JP | 2015160945 A | 9/2015 | |
| WO | 2014087992 A1 | 6/2014 | |
| WO | 2014140399 A1 | 9/2014 | |
| WO | WO-2014179708 A1 * | 11/2014 | ........... C01B 32/198 |
| WO | 2015015386 A1 | 2/2015 | |
| WO | 2015100682 A1 | 7/2015 | |
| WO | 2015121613 A1 | 8/2015 | |
| WO | 2016075465 A1 | 5/2016 | |

OTHER PUBLICATIONS

Clifford et al., Exfoliation of Anthracite: Industrially Achievable? Prepr. Pap.-Am. Chem. Soc., Div. Fuel Chem. 2004, 49(2), 633-635. (Year: 2004).*

PCT/US17/36054, International Search Report and Written Opinion dated Aug. 16, 2017, 9 pages.

(56) References Cited

OTHER PUBLICATIONS

Bor Z. Jang and A. Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Reid, R.C.; Prausnitz, J.M. and Poling, B.E, The Properties of Gases and Liquids, McGraw-Hill, New York, p. 987.
PCT/US17/35770 International Search Report and Written Opinion dated Sep. 1, 2017, 8 pages.
PCT/US17/35779 International Search Report and Written Opinion dated Aug. 17, 2017, 7 pages.
PCT/US17/36029 International Search Report and Written Opinion dated Aug. 29, 2017, 9 pages.
PCT/US17/36030 International Search Report and Written Opinion dated Sep. 6, 2017, 11 pages.
PCT/US17/36056 International Search Report and Written Opinion dated Aug. 10, 2017, 13 pages.
Stankovich et al., "Stable aqueous dispersions of graphitic nanoplatelets via the reduction of exfoliated graphite oxide in the presence of poly(sodium 4-styrenesulfonate)" Journal of Materials Chemistry (2005) vol. 16, pp. 155-158.
U.S. Appl. No. 15/193,090 Nonfinal Office Action dated Mar. 15, 2018, 18 pages.
U.S. Appl. No. 15/193,092 Nonfinal Office Action dated Dec. 14, 2017, 11 pages.
U.S. Appl. No. 15/211,408 Nonfinal Office Action dated Dec. 14, 2017, 10 pages.
WO-2014140399 English language translation from Espacenet.
Kovtyukhova et al., "Non-oxidative intercalation and exfoliation of graphite by Bronsted acids" Nature Chemistry (2014) vol. 6, pp. 957-963.
Sasikala et al., "High yield synthesis of aspect ratio controlled graphenic materials from anthracite coal in supercritical fluids" ACS Nano (2016) vol. 10, pp. 5293-5303.
Sierra et al., "Cokes of different origin as precursors of graphene oxide" Fuel (2016) vol. 166, pp. 400-403.
U.S. Appl. No. 15/193,090 Final Office Action dated Oct. 10, 2018, 23 pages.
U.S. Appl. No. 15/211,269 Final Office Action dated Jul. 17, 2019, 22 pages.
U.S. Appl. No. 15/211,269 Nonfinal Office Action dated Dec. 31, 2018, 14 pages.
U.S. Appl. No. 15/211,727 Final Office Action dated Oct. 24, 2019, 79 pages.
U.S. Appl. No. 16/104,267 Final Office Action dated Sep. 12, 2019, 8 pages.
U.S. Appl. No. 15/211,269 Final Office Action dated Jun. 25, 2020, 18 pages.
U.S. Appl. No. 15/211,269 Nonfinal Office Action dated Mar. 11, 2020, 15 pages.
U.S. Appl. No. 15/211,727 Nonfinal Office Action dated May 1, 2020, 57 pages.
U.S. Appl. No. 15/211,727 Final Office Action dated Aug. 19, 2020, 51 pages.
U.S. Appl. No. 16/596,244 Nonfinal Office Action dated Feb. 22, 2021, 21 pages.

* cited by examiner

SUPERCRITICAL FLUID PRODUCTION OF GRAPHENE-BASED SUPERCAPACITOR ELECTRODE FROM COKE OR COAL

FIELD OF THE INVENTION

The present invention relates to a process for producing a graphene-based supercapacitor electrode directly from natural coal or coal derivatives (e.g. needle coke) using supercritical fluid.

BACKGROUND

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities (volumetric and gravimetric) with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer. Such a supercapacitor is commonly referred to as a pseudo-capacitor or redox supercapacitor. A third type of supercapacitor is a lithium-ion capacitor that contains a pre-lithiated graphite anode, an EDLC cathode (e.g. typically based on activated carbon particles), and a lithium salt electrolyte.

However, there are several serious technical issues associated with current state-of-the-art supercapacitors:

(1) Experience with supercapacitors based on activated carbon electrodes shows that the experimentally measured capacitance is always much lower than the geometrical capacitance calculated from the measured surface area and the width of the dipole layer. For very high surface area activated carbons, typically only about 20-40 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores that are not accessible to liquid electrolyte.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 mg/cm$^2$ (areal density=the amount of active materials per electrode cross-sectional area along the electrode thickness direction) and the apparent volume density or tap density of the active material is typically less than 0.75 g/cm$^3$ (more typically less than 0.5 g/cm$^3$ and most typically less than 0.3 g/cm$^3$) even for relatively large particles of activated carbon.

The low mass loading is primarily due to the inability to obtain thicker graphene-based electrodes (thicker than 100 µm) using the conventional slurry coating procedure. This is not a trivial task as one might think, and in reality the electrode thickness is not a design parameter that can be arbitrarily and freely varied for the purpose of optimizing the cell performance. Contrarily, thicker electrodes tend to become extremely brittle or of poor structural integrity and would also require the use of large amounts of binder resin. These problems are particularly acute for graphene material-based electrodes. It has not been previously possible to produce graphene-based electrodes that are thicker than 100 µm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices.

Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (50 to 150 $F/cm^3$ in most cases, based on the electrode volume), their typical active mass loading of <1 $mg/cm^2$, tap density of <0.2 $g/cm^3$, and electrode thicknesses of up to tens of micrometers (<<100 μm) are still significantly lower than those used in most commercially available electrochemical capacitors (i.e. 10 $mg/cm^2$, 100-200 μm), which results in energy storage devices with relatively low areal and volumetric capacitances and low volumetric energy densities.

(4) For graphene-based supercapacitors, there are additional problems that remain to be solved, explained below:

Graphene exhibits exceptionally high thermal conductivity, high electrical conductivity, high strength, and exceptionally high specific surface area. A single graphene sheet provides a specific external surface area of approximately 2,675 $m^2/g$ (that is accessible by liquid electrolyte), as opposed to the exterior surface area of approximately 1,300 $m^2/g$ provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs. 1-5 below; the $1^{st}$ patent application was submitted in 2006 and issued in 2009]. After 2008, researchers began to realize the significance of graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m=(2/\rho)(1/l+1/w+1/t)$. With $\rho \approx 2.2$ $g/cm^3$, l=100 nm, w=100 nm, and t=0.34 nm (single layer), we have an impressive S/m value of 2,675 $m^2/g$, which is much greater than that of most commercially available carbon black or activated carbon materials used in the state-of-the-art supercapacitor. If two single-layer graphene sheets stack to form a double-layer graphene, the specific surface area is reduced to 1,345 $m^2/g$. For a three-layer graphene, t=1 nm, we have S/m=906 $m^2/g$. If more layers are stacked together, the specific surface area would be further significantly reduced.

These calculations suggest that it is critically important to find a way to prevent individual graphene sheets from re-stacking and, even if they partially re-stack, the resulting multi-layer structure would still have inter-layer pores of adequate sizes. These pores must be sufficiently large to allow for accessibility by the electrolyte and to enable the formation of electric double-layer charges, which presumably require a pore size of at least 1-2 nm. However, these pores or inter-graphene spacings must also be sufficiently small to ensure a large tap density (hence, large capacitance per unit volume or large volumetric energy density). Unfortunately, the typical tap density of graphene-based electrode produced by the conventional process is less than 0.3 $g/cm^3$, and most typically <<0.2 $g/cm^3$. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of forming a thick active material layer onto the surface of a solid current collector (e.g. Al foil) using the conventional graphene-solvent slurry coating process. In such an electrode, the graphene electrode typically requires a large amount of a binder resin (hence, significantly reduced active material proportion vs. non-active or overhead materials/components). In addition, any graphene electrode prepared in this manner that is thicker than 50 μm is brittle and weak. There has been no effective solution to these problems.

Therefore, there is clear and urgent need for supercapacitors that have high active material mass loading (high areal density), active materials with a high apparent density (high tap density), high electrode thickness, high volumetric capacitance, and high volumetric energy density. For graphene-based electrodes, one must also overcome problems such as re-stacking of graphene sheets, the demand for large proportion of a binder resin, and difficulty in producing thick graphene electrode layers.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were reviewed by us [Bor Z. Jang and A. Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded (i.e. oxidized and/or intercalated graphite) or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) Both heat- and solution-induced exfoliation approaches require a very tedious washing and purification step. For instance, typically 2.5 kg of water is used to wash and recover 1 gram of GIC, producing huge quantities of waste water that need to be properly treated.
(5) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.
(6) Furthermore, the quantity of intercalation solution retained on the flakes after draining may range from 20 to 150 parts of solution by weight per 100 parts by weight of graphite flakes (pph) and more typically about 50 to 120 pph.
(7) During the high-temperature exfoliation, the residual intercalate species (e.g. sulfuric acid and nitric acid) retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Sheets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating natural graphite with potassium metal melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2, 3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemicals (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and less damaged), more electrically conductive, and larger/wider graphene sheets.

Furthermore, most of the prior art processes for graphene production begin with the use of highly purified natural graphite as the starting material. The purification of graphite ore involves the use of large amounts of undesirable chemicals. Clearly, a need exists to have a more cost-effective process that produces graphene sheets (particularly single-layer graphene and few-layer graphene sheets) directly from coal or coal derivatives and readily converts the graphene sheets into a porous supercapacitor electrode. Such a process not only avoids the environment-polluting graphite ore purification procedures but also makes it possible to have low-cost graphene available. As of today, the graphene, as an industry, has yet to emerge mainly due to the extremely high graphene costs that have thus far prohibited graphene-based products from being widely accepted in the marketplace.

A further object of the present invention is a process for producing graphene-based supercapacitor electrode that has an active material mass loading higher than 10 $mg/cm^2$, preferably higher than 20 $mg/cm^2$, and more preferably higher than 30 $mg/cm^2$.

SUMMARY OF THE INVENTION

The present invention provides a process for producing a graphene-based supercapacitor electrode from a supply of coke or coal powder containing therein domains of hexagonal carbon atoms and/or hexagonal carbon atomic interlayers with an interlayer spacing (inter-graphene plane spacing).

The process comprises:
(a) exposing this supply of coke or coal powder to a supercritical fluid at a first temperature and a first pressure for a first period of time in a pressure vessel to enable penetration of the supercritical fluid into an internal structure of the coke or coal, wherein the coke or coal powder is selected from petroleum coke, coal-derived coke, meso-phase coke, synthetic coke, leonardite, anthracite, lignite coal, bituminous coal, or natural coal mineral powder, or a combination thereof (preferably, these coke or coal powder particles have never been previously intercalated or oxidized prior to step (a));
(b) rapidly depressurizing said supercritical fluid at a fluid release rate sufficient for effecting exfoliation and separation of said coke or coal powder to produce isolated graphene sheets, which are dispersed in a liquid medium to produce a graphene suspension; and
(c) shaping and drying said graphene suspension to form said supercapacitor electrode that is porous and has a specific surface area greater than 200 $m^2/g$. Preferably, this supercapacitor electrode is in a paper sheet, porous film, porous filament, porous rod, or porous tube form Preferably, the supercritical fluid comprises a fluid selected from carbon dioxide, water, hydrogen peroxide ($H_2O_2$), methanol, ethanol, acetone, methane, ethane, propane, ethylene, propylene, nitrous oxide ($N_2O$), ozone, sulfonic group ($SO_3$), or a combination thereof.

In a preferred embodiment, step (a) is conducted under the influence of ultrasonic waves. In other words, the coke or coal powder is submitted to combined effects of supercritical fluid penetration and ultrasonication.

In a preferred embodiment, step (b) comprises discharging the isolated graphene sheets, during or after the rapid depressurizing operation, into a liquid medium.

In certain embodiments, the process further comprises a procedure of essentially repeating step (a) and step (b), which include (i) subjecting the isolated graphene sheets to a supercritical fluid at a second temperature and a second pressure for a second period of time in a pressure vessel and then (ii) rapidly depressurizing the fluid at a fluid release rate sufficient for effecting further exfoliation and separation of graphene sheets (to further reduce the thickness of a graphene sheet or the number of graphene planes in a graphene sheet). As a result, one can obtain essentially all few-layer graphene or all single-layer graphene sheets. The second temperature can be the same as or different from the first temperature. The second pressure can be the same as or different from the first pressure.

Preferably, the supercritical fluid contains a surfactant or dispersing agent dissolved therein. The pressure vessel can further contain a surfactant or dispersing agent selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

Alternatively, the pressure vessel further contains a surfactant or dispersing agent selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly (sodium-4-styrene sulfonate), or a combination thereof.

In some embodiments, the supercritical fluid contains therein an organic solvent, a monomer, an oligomer, a polymer solution, or a combination thereof. In certain embodiments, the supercritical fluid contains a coating agent dissolved therein. The coating agent may be selected from a monomer, a prepolymer or oligomer, a polymer, a resin, a curing agent, or a combination thereof.

In step (b) of the process, the liquid medium can comprise water, an organic solvent, alcohol, a monomer, an oligomer, or a combination thereof. In certain embodiments, the liquid medium further comprises a monomer or an oligomer dispersed in the liquid medium and step (c) is followed by polymerization of the monomer or oligomer to form a polymer. The process may further comprise a step of thermally converting this polymer into carbon or graphite that acts as a binder to bond the isolated graphene sheets together to form the supercapacitor electrode that has a specific surface area greater than 500 $m^2/g$ (preferably greater than 1,000 $m^2/g$, and more preferably greater than 2,000 $m^2/g$.

In certain embodiments, the liquid medium in step (b) further comprises a polymer dissolved or dispersed in the liquid medium and the isolated graphene sheets are mixed with said polymer to form a composite composition. The procedure may be followed by a further step of thermally converting the polymer into carbon or graphite that acts as a binder to bond the isolated graphene sheets together to form the supercapacitor electrode that has a specific surface area greater than 500 $m^2/g$, preferably and typically greater than 1,000 $m^2/g$, more preferably greater than 1,500 $m^2/g$, and most preferably greater than 2,000 $m^2/g$.

In some preferred embodiments, a desired amount of a foaming agent is added into the graphene suspension and step (c) of the invented process includes depositing the graphene suspension onto a surface of a solid substrate to form a wet graphene film under the influence of a shear stress or compressive stress to align the graphene sheets parallel to the substrate surface, and wherein the wet film is dried and heated to form a porous dry graphene film. The wet graphene film or dry graphene film may be subjected to a heat treatment at a temperature from 100° C. to 3,200° C.

In some preferred embodiments, a desired amount of a foaming agent is added into the graphene suspension and step (c) includes shaping the graphene suspension using a procedure of casting, coating, spraying, printing, extrusion, fiber spinning, or a combination thereof.

The step of shaping and drying said graphene suspension comprises dispensing the suspension onto a surface or two surfaces of a current collector to form said electrode in a film form having a thickness from 1 μm to 1,000 μm.

The step of shaping and drying the graphene suspension comprises dispensing and heat treating the suspension to form a layer of graphene foam having a thickness from 1 μm to 1,000 μm. Alternatively, the step of shaping and drying the graphene suspension comprises freeze-drying the suspension to form a graphene foam electrode.

The process typically enables the supercapacitor electrode to achieve an active material mass loading higher than 10 $mg/cm^2$, more typically higher than 20 $mg/cm^2$, and even more typically higher than 30 $mg/cm^2$.

DETAILED DESCRIPTION OF PREFERRED EMBODIMENTS

Figure 1:
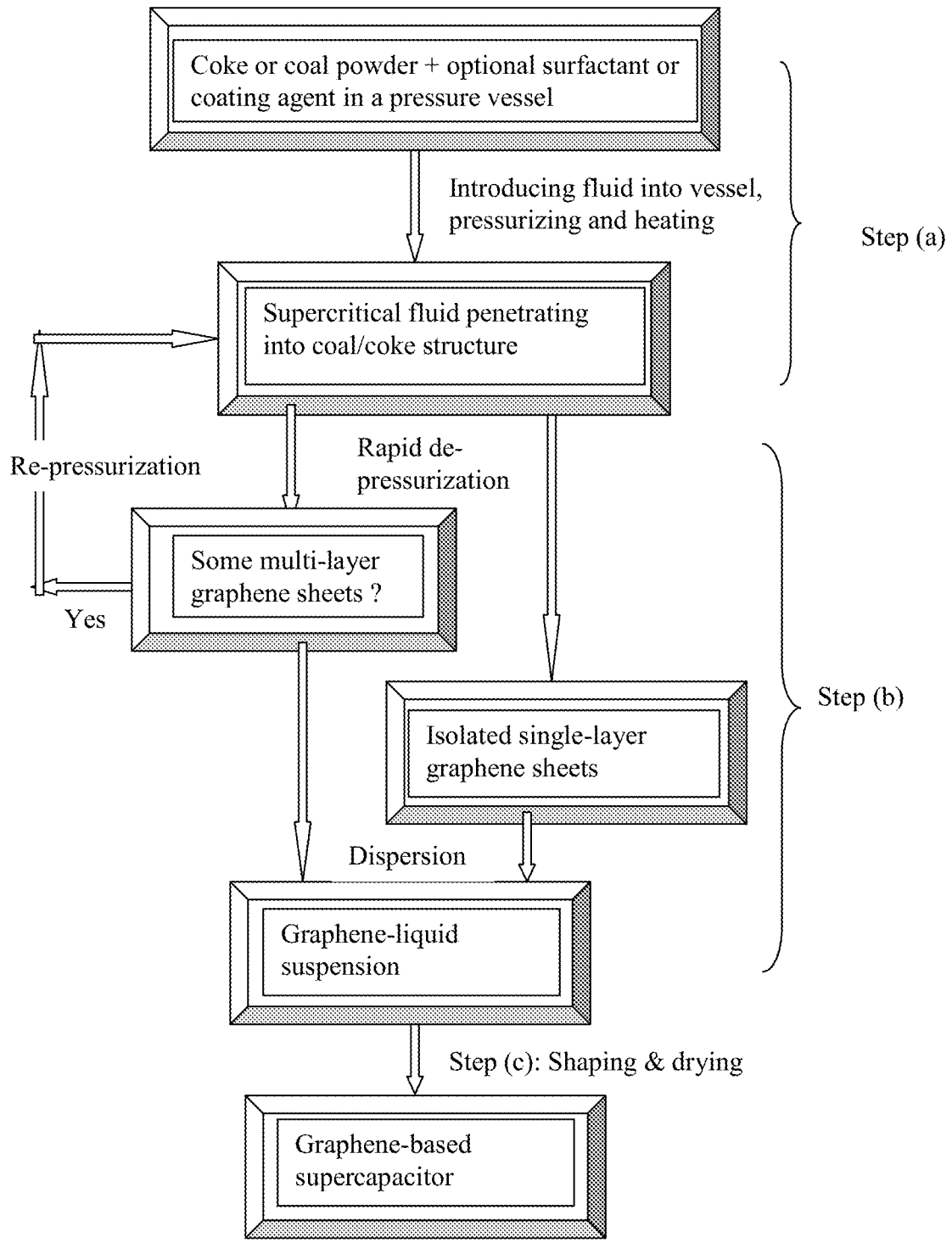
FIG. 1 A flow chart showing an embodiment of the presently invented process for producing graphene-based supercapacitor electrode.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Basically, a graphite material is composed of many graphene planes (hexagonal carbon atomic interlayers) stacked together having inter-planar spacing. These graphene planes can be exfoliated and separated to obtain isolated graphene sheets that can each contain one graphene plane or several graphene planes of hexagonal carbon atoms. Further, natural graphite refers to a graphite material that is produced through purification of graphite mineral (mined graphite ore or graphite rock) typically by a series of flotation and acid treatments. Particles of natural graphite are then subjected to intercalation/oxidation, expansion/exfoliation, and separation/isolation treatments as discussed in the Background section.

The instant invention obviates the need to go through the graphite purification procedures that otherwise generate great amounts of polluting chemicals. In fact, the instant invention avoids the use of natural graphite all together as a starting material for the production of graphene sheets. Instead, we begin with coal or its derivatives (including coke, particularly needle coke). No undesirable chemicals, such as concentrated sulfuric acid, nitric acid, and potassium permanganate, are used in the presently invented process.

One preferred specific embodiment of the present invention is a process for producing isolated graphene sheets, also called nano graphene platelets (NGPs), and graphene-based supercapacitor electrodes directly from coal powder without purification. We have surprisingly discovered that powder of coal (e.g. leonardite or lignite coal) contains therein graphene-like domains or stacks of aromatic molecules that span from 5 nm to 1 μm in length or width. These graphene-like domains contain planes of hexagonal carbon atoms and/or hexagonal carbon atomic interlayers with an interlayer spacing. These stacks or domains of graphene-like planes, molecules or interlayers are typically interconnected with disordered chemical groups containing typically C, O, N, P, and/or H. The presently invented supercritical fluid process is capable of intercalating, exfoliating, and/or separating the interlayers and/or separating domains of graphene-like planes from the surrounding disordered chemical species to obtain isolated graphene sheets. These graphene sheets are concurrently or subsequently dispersed in a liquid medium to form a graphene-liquid suspension. The suspension is then subjected to shaping and drying treatments for forming a supercapacitor electrode.

Each graphene sheet comprises one or multiple planes of two-dimensional hexagonal structure of carbon atoms. Each graphene sheet has a length and a width parallel to the graphene plane and a thickness orthogonal to the graphene plane. By definition, the thickness of an NGP is 100 nanometers (nm) or smaller (more typically <10 nm and most typically and desirably <3.4 nm (i.e. few-layer graphene sheets each containing 2-10 graphene planes), with a single-sheet NGP (single-layer graphene) being as thin as 0.34 nm. The length and width of a NGP are typically between 5 nm and 10 μm, but could be longer or shorter. Generally, the graphene sheets produced from the coal or coke powder using the presently invented method are single-layer graphene or few-layer graphene (2-10 graphene planes stacked together).

A preferred embodiment of the present invention is a process that includes intercalating, exfoliating, and/or separating a coal or coke material with a supercritical fluid to obtain isolated graphene sheets. Optionally, a supercritical fluid can comprise therein a surfactant (or dispersing agent), a coating agent (e.g., a monomer, curing agent, or resin), and/or a reactive species (e.g., ozone, oxygen, acid vapor, $SO_3$, etc.).

If a substance is heated above a critical temperature (Tc) and pressurized above a critical pressure (Pc), it becomes a supercritical fluid. Supercritical fluids provide convenient means to achieve solvating properties, which have both gas and liquid characteristics without actually changing the chemical structure of a substance. With a careful control over the pressure and temperature, several physicochemical properties (e.g., density, diffusivity, dielectric constant, viscosity, and surface free energy) of this substance can be varied to a significant extent. In particular, under supercritical fluid conditions, a fluid can readily diffuse into the internal structure of a solid material. We have surprisingly observed that supercritical fluids can penetrate the spaces between graphene-like or graphene oxide-like planes in a coal or coke structure and, through variations in temperature and pressure, can exfoliate and separate these planes to obtain isolated graphene sheets. The supercritical fluids are also surprisingly capable of severing and extracting graphene domains or individual graphene sheets from a complex graphene domain-amorphous structure commonly found in a coal or coke material.

As an example, carbon dioxide may exist as a supercritical fluid having properties of both a liquid and a gas when above its critical temperature (>31° C.) and critical pressure (>7.4 MPa). Under supercritical fluid conditions, $CO_2$ exhibits both a gaseous property, being able to penetrate through many materials, and a liquid property, being able to dissolve many materials and having essentially zero surface tension. Although $CO_2$ is a preferred medium, the supercritical fluid may be selected from other suitable species, such as water, hydrogen peroxide, ozone, nitrous oxide, methane, ethane, ethylene, propylene, ethanol, methanol, or a mixture thereof (Table 1). The supercritical point of water comprises a temperature of at least about 374° C. and a pressure of at least about 22.1 MPa. At or about the supercritical point, the density and viscosity of water decreases and the diffusivity of water molecules and the mobility of other chemical species dissolved in water increase.

TABLE 1

Critical properties of various solvents
(Reid, R. C.; Prausnitz, J. M. and Poling, B. E., The Properties of Gases and Liquids, McGraw-Hill, New York, 987).

| Solvent | Molecular weight g/mol | Critical temperature (Tc) °K | Critical pressure (Pc) MPa (atm) | Critical density g/cm³ |
|---|---|---|---|---|
| Carbon dioxide ($CO_2$) | 44.01 | 304.1 | 7.38 (72.8) | 0.469 |
| Water ($H_2O$) | 18.015 | 647.096 | 22.064 (217.755) | 0.322 |
| Methane ($CH_4$) | 16.04 | 190.4 | 4.60 (45.4) | 0.162 |
| Ethane ($C_2H_6$) | 30.07 | 305.3 | 4.87 (48.1) | 0.203 |
| Propane ($C_3H_8$) | 44.09 | 369.8 | 4.25 (41.9) | 0.217 |
| Ethylene ($C_2H_4$) | 28.05 | 282.4 | 5.04 (49.7) | 0.215 |
| Propylene ($C_3H_6$) | 42.08 | 364.9 | 4.60 (45.4) | 0.232 |
| Methanol ($CH_3OH$) | 32.04 | 512.6 | 8.09 (79.8) | 0.272 |
| Ethanol ($C_2H_5OH$) | 46.07 | 513.9 | 6.14 (60.6) | 0.276 |
| Acetone ($C_3H_6O$) | 58.08 | 508.1 | 4.70 (46.4) | 0.278 |
| Nitrous oxide ($N_2O$) | 44.013 | 306.57 | 7.35 (72.5) | 0.452 |

Hence, as a preferred embodiment, the presently invented process comprises: (a) exposing a coal or coke material to a supercritical fluid at a first temperature and a first pressure for a first period of time in a pressure vessel and then (b) rapidly depressurizing the fluid by discharging part of the fluid out of the vessel at a fluid release rate sufficient for effecting exfoliation and separation of the graphene-like domains to obtain the desired graphene sheets. Presumably, the supercritical fluid in the pressure vessel penetrates into the spaces between graphene-like planes or between graphene-like domains to form a tentatively intercalated coal/coke compound. With rapid depressurization, the fluid in the interstitial spaces or between domains quickly expands to push apart neighboring graphene layers or severing the amorphous carbon regions that connect graphene-like domains together, a process called delamination/exfoliation or separation/isolation. This step produces graphene sheets that are typically thinner than 10 nm in thickness, more typically thinner than 3.4 nm (few-layer graphene), and often single-layer graphene. The starting material may be selected from petroleum coke, coal-derived coke, mesophase coke, synthetic coke, leonardite, anthracite, lignite coal, bituminous coal, or natural coal mineral powder, or a combination thereof.

As a first step, the starting material (e.g., powder of needle coke or lignite coal) is placed inside a high pressure vessel. The vessel is then sealed off from the atmosphere. This is followed by introducing high-pressure $CO_2$ into the vessel with $CO_2$ being pressurized to preferably above approximately 1,070 to 10,000 psig (7.4 MPa to 69 MPa). Then, the vessel is heated to a temperature above 31.5° C., preferably above about 40° C., and more preferably above 70° C. These conditions define a supercritical condition of $CO_2$ whereby the $CO_2$ is capable of penetrating into inter-graphene spaces or between graphene domains. Pressurizing and heating the coal or coke particles with the supercritical fluid may be accomplished by any conventional means. For instance, the vessel may be heated by a heating jacket or electrical heating tape wrapped around the vessel.

If a chemical species, such as reactive ozone molecules, is desired, it can be introduced into the pressure vessel before, during, or after the intended supercritical fluid is introduced. If the species is in a liquid state (e.g., a surfactant or a curing agent for a resin) or solid state (e.g., a resin), it is preferably placed into the vessel (e.g., mixed with the starting coal/coke material) prior to sealing off the vessel.

The procedure further comprises rapidly depressurizing the tentatively intercalated coal/coke by releasing the fluid out of the vessel at a high rate. During catastrophic depressurization, the supercritical fluid rapidly expands to exfoliate/separate the graphene planes or domains. The depressurization step comprises immediately depressurizing the vessel down to a considerably lower pressure, preferably ambient pressure. This may be accomplished in a time period of between about 5 and 30 seconds, and preferably 15 seconds. Specifically, this may be accomplished by depressurizing the pressure vessel at a rate of between about 0.1 and 5.0 milliliters per second, and preferably 3.0 milliliters per second. The pressure decrease may be accomplished by opening a vessel valve to the atmosphere. As immediate depressurization occurs, the graphite layers are delaminated apart from one another.

The process may further comprise a procedure that involves essentially repeating the pressurization/heating step and the depressurization step for at least another cycle. The repeating cycle includes (a) exposing the graphene sheets (containing multi-layer sheets) to a supercritical fluid at a second temperature and a second pressure for a second period of time in a pressure vessel (preferably the same vessel) and then (b) rapidly de-pressurizing the fluid at a fluid release rate sufficient for effecting further exfoliation/separation of the graphene planes. The second temperature may be different from or the same as the first temperature and the second pressure may be different from or the same as the first pressure. It was observed that a higher pressure for a given pressurization time tended to result in a more effective exfoliation/separation, as evidenced by a reduced average graphene thickness.

In another preferred embodiment, the supercritical fluid contains a surfactant or dispersing agent dissolved therein. Surfactants or dispersing agents that can be used include anionic surfactants, non-ionic surfactants, cationic surfactants, amphoteric surfactants, silicone surfactants, fluorosurfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium ligno-sulphonate (e.g., marketed under the trade names Vanisperse CB and Marasperse CBOS-4 from Borregaard LignoTech), sodium sulfate, sodium phosphate, and sodium sulfonate. Presumably, a surfactant is capable of rapidly covering the new surfaces created during the delamination or separation between two graphene layers, thereby preventing the re-formation of inter-graphene van der Waals forces (re-stacking of two graphene sheets). This speculation was consistent with our surprising observation that the presence of a surfactant tends to result in much thinner graphene sheets as compared with the surfactant-free case under comparable processing conditions. It is of significance to note that the surfactant is normally easy to remove after the formation of isolated graphene sheets; e.g., via heat-induced vaporization or simple water rinsing.

Again, the procedure of supercritical fluid intercalation (pressurizing and heating) and exfoliation/separation (de-pressurization) can be repeated for at least another cycle to further reduce the thickness of NGPs. The cycle can include (a) subjecting the graphene sheets to a supercritical fluid (containing a surfactant dissolved therein) at a second temperature and a second pressure for a second period of time in a pressure vessel and then (b) rapidly depressurizing the fluid at a fluid release rate sufficient for effecting further exfoliation of the NGP material. Again, the second temperature may be different from or the same as the first temperature and the second pressure may be different from or the same as the first pressure.

In yet another preferred embodiment of the present invention, the supercritical fluid contains a coating agent dissolved therein. The process comprises supercritical fluid intercalation (at a first temperature and first pressure) and exfoliation/separation of a coal/coke material to produce graphene sheets and then repeating the supercritical fluid intercalation and exfoliation/separation steps for the resulting graphene sheets. These repeating steps include (a) subjecting the graphene sheets to a supercritical fluid (containing a coating agent dissolved therein) at a second temperature and a second pressure for a second period of time in a pressure vessel and then (b) rapidly de-pressurizing the fluid at a fluid release rate sufficient for effecting further exfoliation/separation of the graphene sheets.

The coating agent may comprise a monomer, a prepolymer or oligomer, a polymer, a resin, a curing agent, or a combination thereof. This process is particularly useful for the production of thin NGP-reinforced polymer composites. For the preparation of a thermoset resin composite, it is advantageous to have a supercritical fluid containing a curing agent dissolved therein. The curing agent, typically a low molecular weight species, can penetrate into the inter-graphene spaces (also referred to as interstitial spaces), along with the supercritical fluid. Upon-depressurization, the curing agent will precipitate out to cover the newly formed graphene surfaces. In addition to possibly serving to prevent the re-joining of graphene layers, the curing agent also acts to change the graphene surface properties, promoting the subsequent wetting of the graphene surface by a thermosetting resin (e.g., epoxide). Hence, the process further comprises mixing the curing agent-covered graphene material with a thermosetting resin.

One may choose to use a coating agent that can be solubilized in the supercritical fluid to diffuse between the graphene planes or between two neighboring graphene-like domains. This coating agent could expand or swell the interstitial spaces between graphene planes to assist in intercalation and exfoliation and, after depressurization, the coating agent could precipitate out to surround and isolate the exfoliated or separated graphene sheets. This coating agent (e.g., a polymer) will eventually become a part (e.g. the matrix) of a composite material. Generally, the coating agent may include a polymer, oligomer, prepolymer, or a monomer. In one embodiment, the coating agent is poly-(dimethyl siloxane) ("PDMS") having a weight average molecular weight of preferably between about 30,000 and 200,000 g/mole. Other suitable coating agents include poly-(tetrafluoroethylene-co-hexafluoropropylene), poly-(per-fluoro-propylene oxide), poly-(diethyl-siloxane), poly-(dimethyl silicone), poly-(phenylmethylsilicone), perfluoroalkylpolyethers, chloro-trifluoro-ethylene, and bromotrifluoroethylene.

The coal/coke powder particles and the coating agent may be disposed in a high pressure vessel that is isolatable from the atmosphere. In this embodiment, the coal/coke particles comprise about 25 to 85 weight percent and the coating agent comprises about 15 to 75 weight percent of material placed in the vessel. Then, the pressure vessel is sealed off from the atmosphere. This is followed by introducing high-pressure carbon dioxide into the compartment with $CO_2$ being pressurized in the vessel to preferably above approximately 1,070 psig (7.4 MPa). Then, the vessel is heated to a temperature preferably above about 40° C. These conditions define a supercritical condition of carbon dioxide whereby the coating agent is solubilized in the supercritical carbon dioxide.

With the coating agent being solubilized in the supercritical fluid, the coating agent diffuses into inter-graphene spaces to possibly expand or swell these spaces. The step of diffusing the coating agent into the spaces between the graphene planes includes maintaining diffusion for between about 10 minutes to 24 hours (preferably 1-3 hours) at supercritical conditions to produce tentatively intercalated coal/coke. The procedure further comprises catastrophically depressurizing the tentatively intercalated coal/coke to precipitate the coating agent from the supercritical fluid. During catastrophic depressurization, the supercritical fluid expands and exfoliates the graphene planes while the coating agent precipitates from the supercritical fluid to cover the layers. Although a coating agent could help, but we have discovered that typically the supercritical fluid alone is sufficiently effective in exfoliating/separating graphene sheets from coal/coke powder.

Presumably, the low viscosity and high diffusivity of the supercritical fluid allows the coating agent solubilized therein to become intercalated between the graphene planes in the coal/coke material under supercritical conditions, thereby possibly increasing the interlayer spacing. Upon depressurization, the supercritical fluid residing in the interstitial spaces rapidly expand and force the layers to exfoliate or delaminate from each other, and the coating agent previously solubilized in the supercritical fluid precipitates therefrom to deposit on the delaminated layers, preventing reformation of the van der Waals forces between graphene layers. That is, the coating agent precipitates from the supercritical fluid and attaches itself to the graphene sheet surfaces.

If the supercritical fluid in its standard state (e.g. at a pressure of 1 atm and temperature of 25° C.) is a liquid (e.g. water, acetone, methanol, and ethanol), the isolated graphene sheets are naturally dispersed in the liquid to form a suspension upon completion of the supercritical fluid treatments (pressurization and rapid de-pressurization). If the fluid is a gas in its standard state (e.g. $CO_2$ at room temperature and 1 atm), the isolated graphene sheets may be discharged, upon rapid de-pressurization, into a liquid medium to form a suspension. In either case, the suspension is subsequently subjected to shaping and drying treatments to form a supercapacitor. Some examples of such shaping and drying treatments are discussed in what follows:

In one example, the shaping and drying procedure includes forming the suspension into a sheet, filament, rod, or tube form using any well-known shaping process (e.g. paper-making, mat forming, extrusion, nonwoven forming, etc.). During and after this process the liquid medium is removed to form a dried shape, allowing the isolated graphene sheets to be naturally packed together to form a porous shape (e.g. a sheet of graphene paper, mat, etc.).

In some preferred embodiments, a desired amount of a foaming agent is added into the graphene suspension and step (c) of the invented process includes depositing the graphene suspension onto a surface of a solid substrate (e.g. an Al foil current collector) to form a wet graphene film under the influence of a shear stress or compressive stress to align the graphene sheets parallel to the substrate surface. The wet film is dried and heated to form a porous dry graphene film. The wet graphene film or dry graphene film is then subjected to a heat treatment at a temperature from 100° C. to 3,200° C. to activate the foaming agent and to reduce or further graphitize the graphene sheets. The porous sheet can be produced in a roll-to-roll manner. The sheet can be cut into a supercapacitor electrode of desired shape and dimensions. Desirably, the step of shaping and drying said graphene suspension comprises dispensing the suspension onto a surface or two surfaces of a current collector to form said electrode in a film form having a thickness from 1 µm to 1,000 µm.

Shaping of the graphene suspension (with or without a foaming agent) may be conducted using a procedure of casting, coating, spraying, printing, extrusion, fiber spinning, or a combination thereof. Alternatively, the step of shaping and drying the graphene suspension comprises freeze-drying the suspension to form a graphene foam electrode. The step of shaping and drying the graphene suspension comprises dispensing and heat treating the suspension to form a layer of graphene foam having a thickness from 1 µm to 1,000 µm (there is no theoretical upper limit to the electrode thickness that can be produced).

In summary, after an extensive study, we have made the following observations:

(1) Supercritical fluids containing no coating agent are in general as effective as those containing a coating agent for intercalating, exfoliating, and separating coal/coke powder. There is no major difference in the supercritical fluid temperature, pressure, time, and de-pressurization conditions between the two cases (one with and the other without a coating agent);

(2) Supercritical fluids, with or without a coating agent dissolved therein, are effective in intercalating, exfoliating, and separating a wide variety of coal/coke materials, including from petroleum coke, coal-derived coke, meso-phase coke, synthetic coke, leonardite, anthracite, lignite coal, bituminous coal, and natural coal mineral powder.

(3) With proper conditions selected for supercritical fluid intercalation, exfoliation and separation, one could readily obtain ultra-thin graphene sheets with a thickness less than 1 nm. With other less favorable conditions (e.g., a lower depressurization rate or gas discharge rate), somewhat thicker NGPs were obtained. However, these thicker NGPs could be subjected to another cycle of supercritical fluid intercalation and exfoliation, preferably in the same pressure chamber, to yield much thinner NGPs. By repeating the cycle one or two times we could readily obtain substantially single-layer graphene.

(4) Supercritical fluids containing a surfactant dissolved therein are more effective than their counterparts containing a coating agent (e.g., polymer, monomer, and oil) or those containing no surfactant and no coating agent.

(5) The presently invented process is fast and environmentally benign.

(6) A functional group can be conveniently imparted to the resulting NGPs if a reactive chemical group is introduced into the pressure vessel to contact the NGPs therein before, during, or after NGPs are formed.

(7) The invented process enables the production of ultra-thick electrodes having large active mass loading (typically >10 mg/cm$^2$, more typically >20 mg/cm$^2$, further more typically >30 mg/cm$^2$, and can be >40 mg/cm$^2$; no upper limit). This is in stark contrast to the typically <<10 mg/cm$^2$ associated with the conventional slurry coating process.

Figure 2:
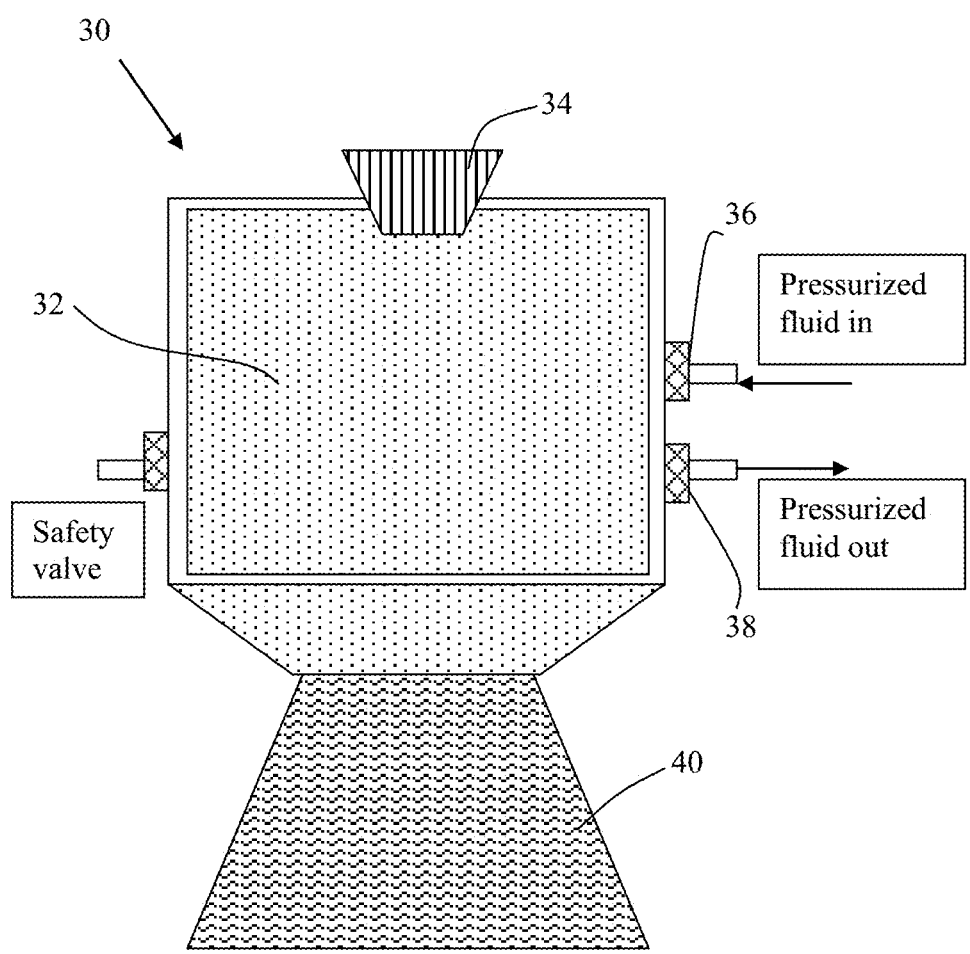
FIG. 2 Schematic drawing of an apparatus that submits coal/coke slurry to a supercritical fluid to produce isolated graphene sheets.

The best modes of practice for instant invention are discussed in more details as follows: A preferred embodiment of the invention is schematically illustrated in FIG. 1 and FIG. 2. The process comprises two steps. Step (a) entails supplying particles of coke or coal powder and an optional surfactant, dispersing agent, or coating agent into a pressure chamber (30 in FIG. 2) and introducing a pressurized fluid into the chamber. The fluid is then heated and pressurized to reach a supercritical fluid state (e.g. a temperature of >31.1° C. and pressure of >72.8 atm for $CO_2$), wherein the optional surfactant, dispersing agent, or coating agent is dissolved in the supercritical fluid (32 in FIG. 2). The coke or coal powder may be selected from petroleum coke, coal-derived coke, meso-phase coke, synthetic coke, leonardite, anthracite, lignite coal, bituminous coal, or natural coal mineral powder, or a combination thereof.

Step (b) entails rapidly de-pressurizing the pressure vessel to produce the isolated graphene sheets. Under certain supercritical fluid conditions (e.g. at the lower end of the pressure scale), the produced graphene sheets can contain some multi-layer graphene platelets or sheets, each typically containing from 5 to 20 graphene planes. These graphene sheets may stay in the same pressure chamber or be discharged into a different pressure chamber having a pressurized fluid, which is then re-pressurized and heated to reach a supercritical fluid condition. After a desired period of supercritical fluid exposure time, the chamber is rapidly de-pressurized to produce thinner graphene sheets. The same or similar pressurization and de-pressurization procedures may be repeated until a desired average graphene thickness (e.g. all graphene sheets being single-layer graphene) is reached. A cascade of supercritical fluid chambers may be connected in series.

As shown in FIG. 2, the pressure chamber (vessel 30) may be equipped with a fluid inlet 36 for introducing pressurized fluid into the vessel and a fluid outlet 38 for rapidly releasing the de-pressurized fluid, which can be re-cycled and re-used. A safety valve is also provided to regulate the fluid pressure of the vessel. The coal or coke powder may be charged, on demand, into the pressure chamber 30 through a controlled conduit 34 and the processed graphene sheets may be discharged through a discharge chamber 40 and get collected by a bag or drop into a collecting liquid.

Alternatively, thick graphene sheets/platelets, after first or second pressurization/de-pressurization treatment, may be subjected to mechanical separation treatments (e.g. airjet milling, rotating-blade shearing, wet milling, etc.) to obtain thinner graphene sheets.

Further alternatively and preferably, the pressure vessel may be equipped with an ultrasonicator device, subjecting the supercritical fluid and the coal/coke powder dispersed therein to ultrasonication. Exposure of coal/coke powder to concurrent supercritical fluid and ultrasonication treatments can produce essentially all few-layer or all single-layer graphene sheets.

Using needle coke as an example, the first step may involve preparing a coke powder sample containing fine needle coke particulates (needle-shaped). The length and/or diameter of these particles are preferably less than 0.2 mm (<200 µm), further preferably less than 0.01 mm (10 µm). They can be smaller than 1 µm. The needle coke particles typically contain nanometer-scaled graphite crystallites with each crystallite being composed of multiple graphene planes.

In one example, the coke powder is then dispersed in a liquid medium (e.g., water, alcohol, or acetone) to obtain a suspension inside a pressure vessel, which is then pressurized and heated for the liquid medium to reach a supercritical fluid state (e.g. 513° K and 8.1 MPa for methanol). A dispersing agent or surfactant may be used to help uniformly disperse particles in the liquid medium. Most importantly, we have surprisingly found that the dispersing agent or surfactant facilitates the exfoliation and separation of graphene sheets from coal/coke particles. Under comparable processing conditions, a coke/coal sample containing a surfactant usually results in much thinner graphene sheets compared to a sample containing no surfactant. It also takes a shorter length of pressurization time for a surfactant-containing suspension to achieve a desired platelet dimension.

Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium lignosulphonate (e.g., marketed under the trade names Vanisperse CB and Marasperse CBOS-4 from Borregaard LignoTech), sodium sulfate, sodium phosphate, and sodium sulfonate.

Advantageously, the surfactant or dispersing agent may be selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof It may be noted that the conventional process for the formation of graphite intercalation compound (GICs) involves the use of highly oxidizing agents (e.g. nitric acid or potassium permanganate), which causes severe oxidation to graphite. Upon oxidation, graphite would suffer from a dramatic loss in electrical and thermal conductivity and this normally cannot be fully recovered.

In contrast, the presently invented process makes use of only very mild fluid mediums (water, alcohol, etc.). Hence, this process obviates the need or possibility to expose the coke/coal material to an oxidizing environment. If so desired, the product after supercritical fluid treatment may be subjected to a subsequent mechanical shearing treatment, such as ball milling, air milling, or rotating-blade shearing, at a relatively low temperature (e.g., room temperature). With this treatment, either individual graphene planes or stacks of graphene planes bonded together (multi-layer NGPs) are further reduced in thickness (decreasing number of layers), width, and length. In addition to the thickness dimension being nano-scaled, both the length and width of these NGPs could be reduced to smaller than 100 nm in size if so desired.

The exfoliation step in the instant invention does not involve the evolution of undesirable species, such as $NO_x$ and $SO_x$, which are common by-products of exfoliating conventional sulfuric or nitric acid-intercalated graphite compounds. These chemical species are highly regulated worldwide.

Supercritical fluid state also enables the resulting graphene sheets to be well dispersed in the very liquid medium wherein the coke/coal powder is dispersed, producing a homogeneous suspension. One major advantage of this approach is that exfoliation, separation, and dispersion of graphene sheets are achieved in a single step when the supercritical fluid is a liquid in its standard state (e.g. water, methanol, ethanol, acetone, and their mixtures). A monomer, oligomer, or polymer may be added to this suspension to form a suspension that is a precursor to a nanocomposite structure. The process may include a further step of converting the suspension to a mat or paper (e.g., using any well-known paper-making process), or converting the nanocomposite precursor suspension to a nanocomposite solid. The polymer composite can then be heat-treated to carbonize the polymer matrix, generating pores in the structure.

Thus, in certain embodiments, the liquid medium comprises water, organic solvent, alcohol, a monomer, an oligomer, or a combination thereof. In other embodiments, the liquid medium further comprises a monomer or an oligomer dispersed in the liquid medium and step (b) is followed by polymerization of the monomer or oligomer to form a polymer. The graphene sheets concurrently produced can be well-dispersed in the polymer. This added advantage is also unexpected.

In some embodiments of the invention, the liquid medium further comprises a polymer dissolved or dispersed in the liquid medium and the isolated graphene sheets are mixed with the polymer to form a composite composition. Alternatively, the resulting graphene sheets, after drying to become a solid powder, may be mixed with a monomer to form a mixture, which can be polymerized to obtain a nanocomposite solid. The graphene sheets can be mixed with a polymer melt to form a mixture that is subsequently solidified to become a nanocomposite solid. These graphene-reinforced polymer composites can be thermally converted to become porous carbon-bonded graphene structures.

Again, a coating agent for adding into the supercritical fluid may be selected from melamine, ammonium sulfate, sodium dodecyl sulfate, sodium (ethylenediamine), tetraalkyammonium, ammonia, carbamide, hexamethylenetetramine, organic amine, poly(sodium-4-styrene sulfonate), or a combination thereof. Some of the wetting agents (e.g. those containing an amine group) also serve to chemically functionalize the isolated graphene sheets, thereby improving the chemical or mechanical compatibility of the graphene sheets with a matrix resin (e.g. epoxy) in a composite material.

Using needle coke as an example, the first step may involve preparing a coke powder sample containing fine needle coke particulates (needle-shaped). The length and/or diameter of these particles are preferably less than 0.2 mm (<200 µm), further preferably less than 0.01 mm (10 µm). They can be smaller than 1 µm. The needle coke particles typically contain nanometer-scaled graphite crystallites with each crystallite being composed of multiple graphene planes.

The powder is then dispersed in a liquid medium (e.g., water, alcohol, or acetone) to obtain a suspension or slurry with the particles being suspended in the liquid medium. Preferably, a dispersing agent or surfactant is used to help uniformly disperse particles in the liquid medium. Most importantly, we have surprisingly found that the dispersing agent or surfactant facilitates the exfoliation and separation of the laminar material. Under comparable processing conditions, a coke/coal sample containing a surfactant usually results in much thinner platelets compared to a sample containing no surfactant. It also takes a shorter length of time for a surfactant-containing suspension to achieve a desired platelet dimension.

Surfactants or dispersing agents that can be used include anionic surfactants, non-ionic surfactants, cationic surfactants, amphoteric surfactants, silicone surfactants, fluorosurfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium lignosulphonate (e.g., marketed under the trade names Vanisperse CB and Marasperse CBOS-4 from Borregaard LignoTech), sodium sulfate, sodium phosphate, and sodium sulfonate.

Advantageously, the surfactant or dispersing agent may be selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof It may be noted that the formation of graphite intercalation compound (GICs) involves the use of highly oxidizing agents (e.g. nitric acid or potassium permanganate), which causes severe oxidation to graphite. Upon oxidation, graphite would suffer from a dramatic loss in electrical and thermal conductivity and this normally cannot be fully recovered.

In contrast, the presently invented process makes use of a mild supercritical fluid temperature typically lying between 31° C. and 250° C. and only very mild liquid mediums are used (water, alcohol, etc.). Hence, this process obviates the need or possibility to expose the layered coke/coal material to an oxidizing environment. Furthermore, the exfoliation step in the instant invention does not involve the evolution of undesirable species, such as $NO_x$ and $SO_x$, which are common by-products of exfoliating conventional sulfuric or nitric acid-intercalated graphite compounds. These chemical species are highly regulated worldwide.

In the presently invented process, step (c) may include depositing graphene suspension onto a surface of a solid substrate to form a wet graphene layer (e.g. a film) under the influence of a shear stress or compressive stress to align the graphene sheets parallel to the substrate surface, and wherein the wet film is heated and dried to form a porous dry graphene film. The graphene suspension may be deposited onto the surface using a procedure of casting, coating, spraying, printing, fiber-spinning, extrusion, or a combination thereof. The wet graphene film or dry graphene film (containing volatile species, foaming agent, or precursor polymer, etc.) may be subjected to a heat treatment at a temperature from 100° C. to 3,200° C. to activate the evolution of gaseous species that lead to the formation of pores in the resulting graphene structure.

The step of shaping and drying the graphene suspension may comprise dispensing the suspension onto a surface or two surfaces of a current collector (e.g. Al foil) to form the desired supercapacitor electrode in a film form having a thickness from 1 µm to 1,000 µm.

Alternatively, the step of shaping and drying the graphene suspension comprises dispensing and heat treating the suspension to form a layer of graphene foam having a thickness from 1 μm to 1,000 μm. A blowing agent or foaming agent may be used.

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range of 130 to 230° C. (266-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bi-carbonate (baking soda), hydrazine, hydrazide, azodicarbonamide (exothermic chemical blowing agents), nitroso compounds (e.g. N, N-Dinitroso pentamethylene tetramine), hydrazine derivatives (e.g. 4. 4'-Oxybis (benzenesulfonyl hydrazide) and Hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being coated or cast onto the supporting substrate. This would result in a foamed structure even when the liquid medium (e.g. water and/or alcohol) is removed. The dried layer of graphene material is capable of maintaining a controlled amount of pores or bubbles during liquid removal and subsequent heat treatments.

Technically feasible blowing agents include Carbon dioxide ($CO_2$), Nitrogen ($N_2$), Isobutane ($C_4H_{10}$), Cyclopentane ($C_5H_{10}$), Isopentane ($C_5H_{12}$), CFC-11 ($CFCI_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Advantageously, the step of shaping and drying the graphene suspension comprises forming the suspension into a desired shape (with desired dimensions) and freeze-drying the suspension to form a graphene foam electrode.

The following examples serve to provide the best modes of practice for the present invention and should not be construed as limiting the scope of the invention:

Example 1: Production of Isolated Graphene Sheets from Milled Coal-Derived Needle Coke Powder Needle coke, milled to an average length <10 μm, was used as the starting material. A needle coke sample (approximately 5 grams) was placed in a 100 milliliter high-pressure vessel. The vessel was equipped with security clamps and rings that enable isolation of the vessel interior from the atmosphere. The vessel was in fluid communication with high-pressure $CO_2$ by way of piping means and controlled or regulated by valves. A heating jacket was wrapped around the vessel to achieve and maintain the critical temperature of carbon dioxide. High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing $CO_2$ to diffuse into inter-graphene spaces and/or the amorphous zones between graphene domains. Then, the vessel was immediately depressurized "catastrophically" at a rate of about 3 milliliters per second. This was accomplished by opening a connected blow-off valve of the vessel. As a result, exfoliated graphene layers were formed, which were found to have an average thickness less than 1.0 nm. Various samples were collected with their morphology studied by SEM, TEM, and AFM observations and their specific surface areas measured by the well-known BET method. The specific surface area of the produced graphene sheets are typically in the range of 735-920 $m^2/g$, indicating that a majority of the graphene sheets being single-layer graphene, consistent with the microscopy results.

An amount of graphene sheets was mixed with water and ultrasonicated for 15 minutes to obtain a suspension, which was then cast onto a glass surface to produce a thin film of approximately 90 nm in thickness. Based on a four-point probe approach, the electrical conductivity of the graphene film was found to be 3,965 S/cm.

For the preparation of supercapacitor electrodes, various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast. The resulting graphene films, after removal of liquid, have a thickness in the range from approximately 10 to 500 µm.

The graphene films were then subjected to heat treatments that involve a thermal reduction temperature of 180-250° C. for 1-5 hours. This heat treatment generated a graphene foam.

In addition, some amounts of the graphene sheets suspended in the suspension were made into a sheet of graphene paper using the well-known vacuum-assisted filtration procedure. The graphene paper sheets-based electrodes made by the instant process exhibit exceptional specific capacitance, typically in the range of 170-250 F/g.

Comparative Example 1a: Concentrated Sulfuric-Nitric Acid-Intercalated Needle Coke Particles One gram of milled needle coke powder as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,000° C. for 45 seconds. The resulting NGPs were examined using SEM and TEM and their length (largest lateral dimension) and thickness were measured. It was observed that, in comparison with the conventional strong acid process for producing graphene, the presently invented supercritical fluid process leads to graphene sheets of comparable thickness distribution, but much larger lateral dimensions (3-5 µm vs. 200-300 nm).

Graphene sheets were made into graphene paper layer using a well-known vacuum-assisted filtration procedure. The graphene paper prepared from hydrazine-reduced graphene oxide (made from sulfuric-nitric acid-intercalated coke) exhibits electrical conductivity values of 11-143 S/cm and specific capacitance of 90-135 F/g. By contrast, the graphene paper prepared from the relatively oxidation-free graphene sheets made by the presently invented supercritical fluid process exhibits a conductivity value of 1,650 S/cm and a specific capacitance of 170-250 F/g.

Comparative Example 1b: Preparation of Pristine NGPs from Natural Graphite Using $CO_2$ Supercritical Fluids A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure $CO_2$ by way of piping means and controlled or regulated by valves. A heating jacket was wrapped around the vessel to achieve and maintain the critical temperature of carbon dioxide. High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing $CO_2$ to diffuse into inter-graphene spaces. Then, the vessel was immediately depressurized "catastrophically' at a rate of about 3 milliliters per second. This was accomplished by opening a connected blow-off valve of the vessel. As a result, exfoliated graphene layers were formed, which were found to contain pristine NGPs with an average thickness of approximately 10 nm.

A small amount of NGPs was mixed with water and ultrasonicated for 15 minutes to obtain a suspension, which was then cast onto a glass surface to produce a thin film of approximately 89 nm in thickness. Based on a four-point probe approach, the electrical conductivity of the NGP film was found to be 909 S/cm. When used as a supercapacitor electrode, the specific capacitance was in the range of 90-125 F/g.

Example 2: Repeated Intercalation and Exfoliation with $CO_2$ Supercritical Fluids Portion of graphene sample produced in Example 1 was removed from the pressure vessel. The remaining graphene sample was subjected to another cycle of supercritical $CO_2$ intercalation and de-pressurization treatments (i.e., the above procedures were repeated with a pressure of 7.5 MPa and temperature 65° C.), yielding mostly single-layer graphene.

A small amount of single-layer graphene sheets were then re-dispersed in a hydrogen peroxide-water solution (30% $H_2O_2$) for 24 hours to prepare graphene oxide sheets. These graphene oxide sheets were then mixed with the original pristine single-layer graphene sheets at a weight ratio of 1:3 in DI water to obtain a mixture suspension.

The mixture suspension was then cast onto a glass surface using a doctor's blade to exert shear stresses, inducing graphene sheet orientations. The resulting graphene films, after removal of liquid, have a thickness of 200 µm. The graphene films were then subjected to heat treatments that involve a thermal reduction temperature of 80-1,500° C. for 1-5 hours. This heat treatment generated a layer of graphene foam as a supercapacitor electrode.

Example 3: Preparation of Pristine Graphene from Coal-Derived Needle Coke Using $CO_2$ Supercritical Fluids Containing a Surfactant Another graphene sample was prepared under essentially identical supercritical $CO_2$ conditions as in Example 1, with the exception that a small amount of surfactant (approximately 0.05 grams of Zonyl® FSO) was mixed with 5 grams of needle coke before the mixture was sealed in the pressure vessel. The resulting NGPs have a surprisingly low average thickness, 0.8 nm. After the pressurization and de-pressurization procedures were repeated for one more cycle, the resulting NGPs were mostly single-layer.

A suspension containing single-layer graphene sheets and a surfactant (melamine) dispersed in water was then sprayed onto a glass surface and the resulting graphene films, after removal of liquid, have a thickness of 150-1,200 μm. The graphene films were then subjected to heat treatments that involve a thermal decomposition temperature of 450° C. for 3 hours to remove melamine-derived volatile species. This treatment generated a layer of graphene foam as a supercapacitor electrode. The thickness was varied from 200 to 2,000 μm; however, there is no upper limit on the thickness of the supercapacitor electrodes prepared according to the instant process. The achievable active mass loading was from 15 to 150 mg/cm². This is quite unexpected since the conventional slurry coating process has been incapable of coating a graphene-based supercapacitor electrode having a thickness above 150 μm or an active material loading above 10 mg/cm².

Example 4: Production of Isolated Graphene Sheets and Graphene Electrodes from Milled Petroleum Needle Coke Powder Needle coke, milled to an average length <10 μm, was used as the starting material. The dispersing agents selected include melamine, sodium (ethylenediamine), and hexamethylenetetramine. Approximately 5 grams of petroleum needle coke were placed in a high pressure vessel, which was supplied with $CO_2$ gas through pipe means as in Example 1. The pressure at approximately 8.5 MPa was maintained while the vessel was heated to about 70° C. to achieve a supercritical condition of carbon dioxide. This intercalation process was conducted for about 1 hour, followed by a sudden depressurization to the ambient pressure. The resulting expanded/exfoliated structure after the initial cycle was investigated using AFM, SEM, and BET measurements. The NGPs obtained were found to have an average thickness of 1.3 nm. The intercalation and exfoliation steps were repeated for another cycle and the resulting graphene sheets are all single-layer or double-layer.

A small amount of polyethylene oxide (PEO/graphene ratio=1/20 by weight) was added into the water suspension containing graphene sheets after mechanical shearing. The suspension was extruded into filaments that are 1 mm in diameters, which were heated at 450° C. for 3 hours to produce filamentary electrodes. The filament diameters can be as small as 50 nm if electro-spinning is used to produce nano-fibers.

Example 5: Graphene Electrodes from Milled Lignite Coal Powder

In one example, samples of two grams each of lignite coal were milled down to an average diameter of 25.6 μm. The powder samples were subjected to ethanol-based supercritical fluid treatments: 514° K and 6.4 MPa, followed by rapid de-pressurization. The resulting graphene sheets exhibit a thickness ranging from single-layer graphene sheets to 3-layer graphene sheets based on SEM and TEM observations. The resulting suspension was cast into films and then heat-treated at 100° C. for 1 hour and then 350° C. for 4 hours to produce sheets of graphene foam. The specific capacitance of these sheets of foam was found to be 175-210 F/g.

Example 6: Production of Isolated Graphene Sheets and Graphene Electrodes from Anthracite Coal Taixi coal from Shanxi, China was used as the starting material for the preparation of isolated graphene sheets and graphene electrodes. The raw coal was ground and sieved to a powder with an average particle size less than 200 μm. The coal powder was further size-reduced for 2.5 h by ball milling. The diameter of more than 90% of milled powder particles is less than 15 μm after milling. The raw coal powder was treated with hydrochloride in a beaker at 50° C. for 4 h to make modified coal (MC), and then it was washed with distilled water until no was detected in the filtrate. The modified coal was heat treated in the presence of Fe to transform coal into graphite-like carbon. The MC powder and $Fe_2(SO4)_3$ [TX-de:$Fe_2(SO4)_3$=16:12.6] was well-mixed by ball milling for 2 min, and then the mixture was subjected to catalytic graphitization at 2400° C. for 2 h under argon.

The coal-derived powder samples were subjected to methanol-based supercritical fluid treatments under the conditions of 513° K and 8.2 MPa for 2 hours, followed by rapid de-pressurization. The resulting graphene sheets exhibit a thickness ranging from single-layer graphene sheets to 5-layer graphene sheets based on SEM and TEM observations.

Isolated graphene sheets were re-dispersed in water, along with some 10% by weight of sodium bi-carbonate (baking soda). The resulting suspension was then coated onto a sheet of PET film to form a wet layer, which was dried and peeled off from the PET film. The dried graphene/sodium bi-carbonate layer was then heated to 185° C. to produce a porous graphene electrode layer, which exhibits a specific surface area of 1,520 m2/g and delivers an impressive specific capacitance of 265 F/g Example 6: Production of Isolated Graphene Sheets and Graphene-Based Supercapacitor Electrodes from Bituminous Coal In an example, 300 mg of bituminous coal was placed in a pressure vessel, which was then subjected to a $CO_2$ supercritical fluid intercalation for 1 h, followed by rapid pressure release. The product was poured into a beaker containing a mixture of water and ethanol. After purification, the solution was cast to obtain a film of solid humic acid sheets. The film was heat-treated at 450° C. under a stream of $N_2/H_2$ gas mixture for 2 hours to obtain a sheet of graphene-like foam, which exhibits a specific surface area of 1,120 m2/g and delivers a high specific capacitance of 233 F/g.

Example 7: Production of Graphene-Based Electrodes from Leonardite Coal Using a Supercritical Fluid Containing $SO_3$ $SO_3$ vapor was generated by adding and heating 10 g of fuming sulfuric acid into a reactor. The $SO_3$ vapor was passed through a column in which 10 g of leonardite was packed for receiving $SO_3$. After exposure of leonardite to $SO_3$ for one hour, the treated leonardite sample was placed in a pressure vessel. The vessel was supplied with $CO_2$ gas through pipe means as in Example 1. The pressure at approximately 8.5 MPa was maintained while the vessel was heated to about 70° C. to achieve a supercritical condition of carbon dioxide. Presumably $SO_3$ was dissolved in supercritical $CO_2$. This $CO_2/SO_3$ intercalation process was allowed to proceed for about 3 hours, followed by a sudden depressurization to the ambient pressure.

Upon completion of the procedure, the vessel containing NGPs was slightly heated at about 60° C. for about 15 minutes to remove excessive amount of $SO_3$ condensed on the surface of the NGPs, and the separated $SO_3$ was recovered and absorbed into the sulfuric acid in the reactor.

SO$_3$-treated NGPs were washed with water and filtered. Surprisingly, SO$_3$-treated NGPs were found to be readily dispersible in water. It appears that SO$_3$ has slightly sulfonated NGPs, imparting desirable functional groups thereto.

It is of significance to note that SO$_3$, O$_3$ (ozone) and O$_2$ are but a few examples of reactive species that can be included in a supercritical fluid for exfoliating and, essentially concurrently, functionalizing NGPs. As compared to a sample without SO$_3$ functionalization, this functionalized electrode leads to a significant increase in specific capacitance, from 167 F/g to 312 F/g, in an aqueous (sodium sulfate) electrolyte likely due to the presence of redox pairs that involve SO$_3$.

Example 8: Details about Evaluation of Various Supercapacitor Cells

In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 µm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I * t/m \quad (1)$$

where I is the constant current in mA, t is the time in hours, and m is the cathode active material mass in grams. With voltage V, the specific energy (E) is calculated as, $$E = \int V dq \quad (2)$$

The specific power (P) can be calculated as $$P = (E/t) \text{ (W/kg)} \quad (3)$$

where t is the total charge or discharge step time in hours. The specific capacitance (C) of the cell is represented by the slope at each point of the voltage vs. specific capacity plot, $$C = dq/dV \quad (4)$$

For each sample, several current density (representing charge/discharge rates) were imposed to determine the electrochemical responses, allowing for calculations of energy density and power density values required of the construction of a Ragone plot (power density vs. energy density).

Example 9: Achievable Tap Density of the Electrode and its Effect on Electrochemical Performance of Supercapacitor Cells The presently invented process allows us to prepare a graphene-based supercapacitor electrode of any practical tap density from 0.1 to 1.1 g/cm$^3$. It may be noted that the graphene-based supercapacitor electrodes prepared by conventional processes are limited to <0.3 and mostly <0.1 g/cm$^3$. Furthermore, as discussed earlier, only thinner electrodes can be prepared using these conventional processes. As a point of reference, the activated carbon-based electrode exhibits a tap density typically from 0.3 to 0.5 g/cm$^3$.

Figure 3:
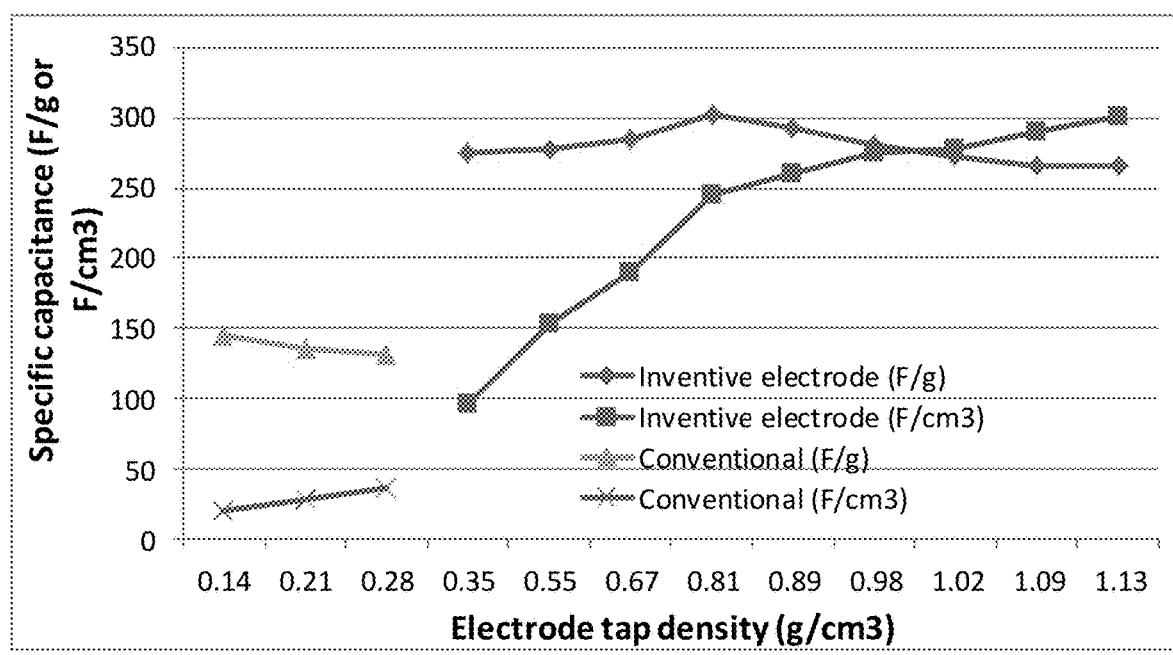
FIG. 3 Electrode specific capacitance of supercapacitors using an organic electrolyte (acetonitrile) and graphene produced from coal and graphite, respectively.

A series of EDLC electrodes with different tap densities were prepared from the same batch of graphene suspension. The volume and weights of an electrode were measured before and after foaming and before and after roll-pressing. These measurements enabled us to estimate the tap density of the dried electrode. For comparison purposes, graphene-based electrodes of comparable thickness (70-75 µm) were also prepared using the conventional slurry coating process (the wet-dry-wet procedures). The electrode specific capacitance values of these supercapacitors using an organic electrolyte (acetonitrile) are summarized in FIG. 3. There are several significant observations that can be made from these data:

(A) Given comparable electrode thickness, the presently invented graphene supercapacitors prepared from the supercritical fluid route exhibit significantly higher gravimetric specific capacitance (266-302 F/g) as compared to those (typically 130-150 F/g) of the corresponding graphene-based electrodes prepared by the conventional process, all based on EDLC alone.

(B) The highest achievable tap density of the electrode prepared by the conventional method is 0.14-0.28 g/cm$^3$. In contrast, the presently invented process makes it possible to achieve a tap density of 0.35-1.13 g/cm$^3$ (based on this series of samples alone); these unprecedented values even surpass those (0.3-0.5 g/cm$^3$) of activated carbon electrodes by a large margin. This is truly remarkable and unexpected.

(C) The presently invented graphene electrodes exhibit a volumetric specific capacitance up to 301 F/cm$^3$, which is also an unprecedented value. In contrast, the graphene electrodes prepared according to the conventional method shows a specific capacitance in the range of 21-40 F/cm$^3$; the differences are dramatic.

Figure 4:
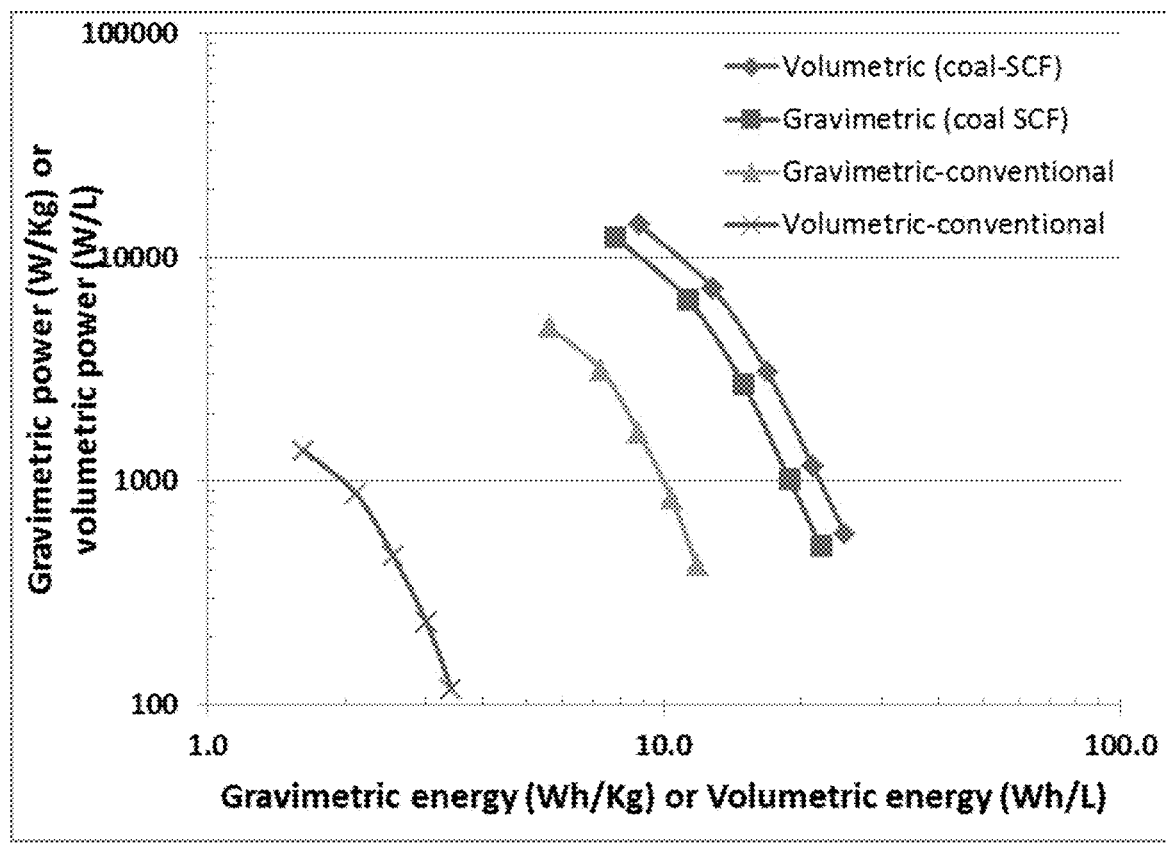
FIG. 4 Ragone plots (gravimetric and volumetric power density vs. gravimetric and volumetric energy density) of two sets of symmetric supercapacitor (EDLC) cells: one containing coke-derived graphene prepared by the instant process and the other natural graphite-derived graphene.

Shown in FIG. 4 are Ragone plots (gravimetric and volumetric power density vs. energy density) of two sets of symmetric supercapacitor (EDLC) cells containing graphene sheets as the electrode active material and EMIMBF4 ionic liquid as the electrolyte. One of the two series of supercapacitors was based on the graphene electrode (coke-derived graphene) prepared according to an embodiment of instant invention and the other was by the conventional slurry coating of electrodes (natural graphite-derived graphene sheets). Several significant observations can be made from these data:

(A) Both the gravimetric and volumetric energy densities and power densities of the supercapacitor cells prepared by the presently invented method (denoted as "inventive" in the figure legend) are significantly higher than those of their counterparts prepared via the conventional method (denoted as "conventional"). The differences are highly dramatic and are mainly due to the high active material mass loading (>20 mg/cm$^2$) associated with the presently invented cells, reduced proportion of overhead components (non-active) relative to the active material weight/volume, no binder resin, the ability of the inventive method to more effectively pack graphene sheets together without graphene sheet re-stacking.

(B) For the cells prepared by the conventional method, the absolute magnitudes of the volumetric energy densities and volumetric power densities are significantly lower than those of their gravimetric energy densities and gravimetric power densities, due to the very low tap density (packing density of 0.29 g/cm$^3$) of isolated graphene sheet-based electrodes prepared by the conventional slurry coating method.

(C) In contrast, for the cells prepared by the presently invented method, the absolute magnitudes of the volumetric energy densities and volumetric power densities are higher than those of their gravimetric energy densities and gravimetric power densities, due to the relatively high tap density (packing density of 1.13 g/cm$^3$) of graphene-based electrodes prepared by the presently invented method.

The invention claimed is:

1. A process for producing a graphene-based supercapacitor electrode from a supply of coal powder containing therein domains of hexagonal carbon atoms and/or hexagonal carbon atomic interlayers with an interlayer spacing, said process comprising:
  (a) exposing said supply of coal powder to a supercritical fluid at a first temperature and a first pressure for a first period of time in a pressure vessel to cause penetration of the supercritical fluid into an internal structure of the coal, wherein said coal powder is selected from the group consisting of leonardite, anthracite, lignite coal, bituminous coal, and a combination thereof;
  (b) rapidly depressurizing said supercritical fluid from the first pressure at a fluid release rate sufficient to cause exfoliation and separation of said coal powder to produce isolated graphene sheets, the isolated graphene sheets being combined with and dispersed in a liquid medium to produce a graphene suspension; and
  (c) shaping and drying said graphene suspension and then heat treating the dried suspension to form a supercapacitor electrode in the form of a graphene foam, wherein the supercapacitor electrode is porous and has a specific surface area greater than 500 m$^2$/g, a gravimetric specific capacitance of 266-302 F/g and a tap density of 0.35-1.13 g/cm$^3$.

2. The process of claim 1, wherein particles of said coal powder have never been previously intercalated or oxidized prior to step (a).

3. The process of claim 1, wherein said supercapacitor electrode is in a paper sheet, film, filament, rod, or tube form.

4. The process of claim 1, wherein said supercritical fluid comprises a fluid selected from carbon dioxide, water, hydrogen peroxide ($H_2O_2$), methanol, ethanol, acetone, methane, ethane, propane, ethylene, propylene, nitrous oxide ($N_2O$), ozone, sulfonic vapor ($SO_3$), or a combination thereof.

5. The process of claim 1, wherein said step (a) is conducted under the influence of ultrasonic waves.

6. The process of claim 1, further comprising a procedure of repeating step (a) and step (b) that includes (i) subjecting said isolated graphene sheets to a supercritical fluid at a second temperature and a second pressure for a second period of time in a pressure vessel, and then (ii) rapidly depressurizing said fluid from the second pressure at a fluid release rate sufficient for effecting further exfoliation and separation of the isolated graphene sheets.

7. The process of claim 1, wherein said supercritical fluid contains a surfactant or dispersing agent dissolved therein.

8. The process of claim 1, wherein said pressure vessel further contains a surfactant or dispersing agent selected from the group consisting of anionic surfactants, nonionic surfactants, cationic surfactants, amphoteric surfactants, organic amine, and combinations thereof.

9. The process of claim 1, wherein said pressure vessel further contains a surfactant or dispersing agent selected from melamine, ammonium sulfate, sodium dodecyl sulfate, sodium (ethylenediamine), tetraalkyammonium, ammonia, carbamide, hexamethylenetetramine, pyrene, 1-pyrenecarboxylic acid, 1-pyrenebutyric acid, 1-pyrenamine, poly(sodium-4-styrene sulfonate), silicone surfactants, fluoro-surfactants, sodium hexametaphosphate, sodium lignosulfonate, poly (sodium 4-styrene sulfonate), sodium sulfate, sodium phosphate, sodium sulfonate, or a combination thereof.

10. The process of claim 1, wherein said supercritical fluid contains therein an organic solvent, a monomer, an oligomer, a polymer solution, or a combination thereof.

11. The process of claim 1, wherein said supercritical fluid contains a coating agent dissolved therein.

12. The process of claim 11, wherein said coating agent comprises a monomer, a prepolymer or oligomer, a polymer, a resin, a curing agent, or a combination thereof.

13. The process of claim 1, wherein said liquid medium comprises water, an organic solvent, alcohol, a monomer, an oligomer, or a combination thereof.

14. The process of claim 1, wherein said liquid medium further comprises a monomer or an oligomer dispersed in said liquid medium and said step (c) further comprises polymerizing said monomer or oligomer to form a polymer.

15. The process of claim 14, further comprising a step of thermally converting said polymer into carbon or graphite that acts as a binder to bond said isolated graphene sheets together to form said supercapacitor electrode.

16. The process of claim 15, wherein said specific surface area is greater than 1,000 m$^2$/g.

17. The process of claim 16, wherein said specific surface area is greater than 2,000 m$^2$/g.

18. The process of claim 1, wherein said liquid medium of step (b) further comprises a polymer dissolved or dispersed in said liquid medium and said isolated graphene sheets are mixed with said polymer to form a composite composition as said graphene suspension.

19. The process of claim 18, said step (c) further comprising thermally converting said polymer into carbon or graphite that acts as a binder to bond said isolated graphene sheets together to form said supercapacitor electrode.

20. The process of claim 19, wherein said specific surface area is greater than 1,000 m$^2$/g.

21. The process of claim 1, wherein said step (b) comprises discharging said isolated graphene sheets, during or after said depressurizing, into said liquid medium.

22. The process of claim 1, wherein said step of shaping and drying said graphene suspension comprises dispensing said suspension onto a surface or two surfaces of a current collector to form said electrode in a film form having a thickness from 1 μm to 1,000 μm.

23. The process of claim 1, wherein said step of shaping and drying said graphene suspension comprises dispensing followed by said heat treating to form the graphene foam as a layer having a thickness from 1 μm to 1,000 μm.

24. The process of claim 1, wherein said electrode has an active material mass loading higher than 10 mg/cm$^2$.

25. The process of claim 1, wherein said electrode has an active material mass loading higher than 20 mg/cm$^2$.

26. The process of claim 1, wherein said heat treatment is performed at a temperature from 100° C. to 3,200° C.

27. A process for producing a graphene-based supercapacitor electrode from a supply of coal powder containing therein domains of hexagonal carbon atoms and/or hexagonal carbon atomic interlayers with an interlayer spacing, said process comprising:
  (a) exposing said supply of coal powder to a supercritical fluid at a first temperature and a first pressure for a first period of time in a pressure vessel to cause penetration of the supercritical fluid into an internal structure of the coal, wherein said coal powder is selected from the group consisting of leonardite, anthracite, lignite coal, bituminous coal, and a combination thereof;
(b) rapidly depressurizing said supercritical fluid from the first pressure at a fluid release rate sufficient to cause exfoliation and separation of said coal powder to produce isolated graphene sheets, the isolated graphene sheets being combined with and dispersed in a liquid medium to produce a graphene suspension; and
(c) shaping and drying said graphene suspension and then heat treating the dried suspension to form said supercapacitor electrode in the form of a graphene foam, wherein the supercapacitor electrode is porous and has a specific surface area greater than 500 $m^2/g$, a gravimetric specific capacitance of 266-302 F/g, and a tap density greater than 0.35 $g/cm^3$ and up to 1.13 $g/cm^3$, wherein an amount of a foaming agent is added into said graphene suspension and said step (c) includes depositing said graphene suspension onto a surface of a solid substrate to form a wet graphene film under the influence of a shear stress or compressive stress to align said graphene sheets parallel to said substrate surface, and wherein said wet film is subjected to said drying and heat treatment to form a porous dry graphene film as said graphene foam.

28. The process of claim 27, wherein said heat treatment is performed at a temperature from 100° C. to 3,200° C.

29. A process for producing a graphene-based supercapacitor electrode from a supply of coal powder containing therein domains of hexagonal carbon atoms and/or hexagonal carbon atomic interlayers with an interlayer spacing, said process comprising: (a) exposing said supply of coal powder to a supercritical fluid at a first temperature and a first pressure for a first period of time in a pressure vessel to cause penetration of the supercritical fluid into an internal structure of the coal, wherein said coal powder is selected from the group consisting of leonardite, anthracite, lignite coal, bituminous coal, and a combination thereof;
(b) rapidly depressurizing said supercritical fluid from the first pressure at a fluid release rate sufficient to cause exfoliation and separation of said coal powder to produce isolated graphene sheets, the isolated graphene sheets being combined with and dispersed in a liquid medium to produce a graphene suspension; and
(c) shaping and drying said graphene suspension and then heat treating the dried suspension to form said supercapacitor electrode in the form of a graphene foam, wherein the supercapacitor electrode is porous and has a specific surface area greater than 500 $m^2/g$, a gravimetric specific capacitance of 266-302 F/g and a tap density of 0.35-1.13 $g/cm^3$, wherein an amount of a foaming agent is added into said graphene suspension and said step (c) includes shaping the graphene suspension using a procedure of casting, coating, spraying, printing, extrusion, fiber spinning, or a combination thereof.

* * * * *